United States Patent
Sousa Ferreira et al.

(10) Patent No.: US 12,488,459 B2
(45) Date of Patent: Dec. 2, 2025

(54) AUTOMATIC DETECTION OF COLON LESIONS AND BLOOD IN COLON CAPSULE ENDOSCOPY

(71) Applicant: DIGESTAID—ARTIFICIAL INTELLIGENCE DEVELOPMENT, LDA, Gondomar (PT)

(72) Inventors: João Pedro Sousa Ferreira, Oporto (PT); Miguel José Da Quinta E Costa De Mascarenhas Saraiva, Oporto (PT); Hélder Manuel Casal Cardoso, Valbom Gondomar (PT); Manuel Guilherme Goncalves De Macedo, Oporto (PT); João Pedro Lima Afonso, Mazedo Moncao (PT); Ana Patricia Ribeiro Andrade, Oporto (PT); Renato Manue Natal Jorge, Oporto (PT); Marco Paulo Lages Parente, Oporto (PT)

(73) Assignee: Digestaid—Artificial Intelligence Development, LDA, Gondomar (PT)

( * ) Notice: Subject to any disclaimer, the term of this patent is extended or adjusted under 35 U.S.C. 154(b) by 322 days.

(21) Appl. No.: 18/037,980

(22) PCT Filed: Nov. 18, 2021

(86) PCT No.: PCT/PT2021/050040
§ 371 (c)(1),
(2) Date: May 19, 2023

(87) PCT Pub. No.: WO2022/108465
PCT Pub. Date: May 27, 2022

(65) Prior Publication Data
US 2023/0410295 A1    Dec. 21, 2023

(30) Foreign Application Priority Data

Nov. 19, 2020 (PT) .......................... 116895

(51) Int. Cl.
*G06V 10/764*    (2022.01)
*G06N 3/045*    (2023.01)
(Continued)

(52) U.S. Cl.
CPC .......... *G06T 7/0012* (2013.01); *G06N 3/045* (2023.01); *G06N 3/096* (2023.01); *G06V 10/764* (2022.01);
(Continued)

(58) Field of Classification Search
CPC ................... G06N 3/045; G06N 3/096; G06T 2207/10068; G06T 2207/20081;
(Continued)

(56) References Cited

U.S. PATENT DOCUMENTS 5,790,761 A * 8/1998 Heseltine ............... G16H 50/20
706/924
12,079,993 B1 * 9/2024 Lochner ................. G16H 30/40
(Continued)

OTHER PUBLICATIONS

Patent Cooperation Treaty, Written Opinion and International Search Report issued in PCT/PT2021/050040, Mar. 14, 2022, pp. 1-16.
(Continued)

*Primary Examiner* — Tsung Yin Tsai
(74) *Attorney, Agent, or Firm* — Heisler & Associates

(57) ABSTRACT

The present invention relates to a computer-implemented method, capable of automatically detecting clinically relevant colonic pleomorphic lesions and blood or hematic traces in colon capsule endoscopy images, by classifying pixels as colonic pleomorphic lesions or blood or hematic traces, using a convolutional image feature extraction step followed by a classification and indexing step of such findings into a set of one or more classes.

23 Claims, 12 Drawing Sheets

(51) Int. Cl.
*G06N 3/096* (2023.01)
*G06T 7/00* (2017.01)
*G06V 10/77* (2022.01)
*G06V 10/776* (2022.01)
*G06V 10/94* (2022.01)
*A61B 1/04* (2006.01)

(52) U.S. Cl.
CPC ........ *G06V 10/7715* (2022.01); *G06V 10/776* (2022.01); *G06V 10/945* (2022.01); *A61B 1/041* (2013.01); *G06T 2207/10068* (2013.01); *G06T 2207/20081* (2013.01); *G06T 2207/20084* (2013.01); *G06T 2207/20092* (2013.01); *G06T 2207/30028* (2013.01); *G06T 2207/30096* (2013.01); *G06V 2201/03* (2022.01)

(58) Field of Classification Search
CPC . G06T 2207/20084; G06T 2207/20092; G06T 2207/30028; G06T 2207/30096; G06T 7/0012; G06V 10/764; G06V 10/7715; G06V 10/776; G06V 10/82; G06V 10/945; G06V 2201/03; G06V 2201/031; A61B 1/41; A61B 5/6861
See application file for complete search history.

(56) References Cited

U.S. PATENT DOCUMENTS

2004/0122702 A1* 6/2004 Sabol ................... G06Q 10/10
706/45
2006/0115827 A1* 6/2006 Lenz .................. C07K 16/2863
435/6.16

OTHER PUBLICATIONS

Valerio et al., "Lesions Multiclass Classification in Endoscopic Capsule Frames", Procedia Computer Science, 2019, pp. 637-645, vol. 164.
Wang et al., "A systematic evaluation and optimization of automatic detection of ulcers in wireless capsule endoscopy on a large dataset using deep convolutional neural networks", Physics in Medicine and Biology, Institute of Physics Publishing, Dec. 5, 2019, pp. 1-13, vol. 64(23).
Yan et al., ""Intelligent diagnosis of gastric intestinal metaplasia based on convolutional neural network and limited humber of endoscopic images", Computers in Biology and Medicine, Oct. 12, 2020, pp. 1-8, vol. 126.
Kyriakides et al., "An Introduction to Neural Architecture Search for Convolutional Networks", ARXIV.ORG, University of Macedonia, May 22, 2020, pp. 1-17.

* cited by examiner

| Evaluation of method 9000 | Best overall accuracy (mean ± standard deviation in %) | |
|---|---|---|
| | with method 8000 (our method) | without method 8000 |
| VGG | 95.3 ± 1.1 | 93,4 |
| ResNet50 | 94.1 ± 3.2 | 90,6 |
| ResNet125 | 96.2 ± 4.1 | 91,2 |
| InceptionV3 | 93.8 ± 3.5 | 91,4 |
| MobileNet | 91.3 ± 1.7 | 89,3 |
| Xception | 98.6 ± 1.1 | 95,7 |
| EfficientNetB3 | 93.3 ± 2.2 | 90,8 |
| EfficientNetB5 | 96.2 ± 3.1 | 93,3 |
| EfficientNetB7 | 98.4 ± 1.2 | 97,6 |

FIG. 11

AUTOMATIC DETECTION OF COLON LESIONS AND BLOOD IN COLON CAPSULE ENDOSCOPY

RELATED PATENT APPLICATIONS

This patent application is the National Phase of International Application No. PCT/PT2021/050040, filed Nov. 18, 2021, which designated the U.S. and that International Application was published under PCT Article 21(2) in English, which claims the benefit of priority to Portuguese Patent Application No. 116895, filed Nov. 19, 2020. The entire contents of the foregoing applications are incorporated herein by reference, including all text, tables and drawings.

BACKGROUND OF THE INVENTION

The present invention relates to lesion detection and classification in colon capsule endoscopy images. More particularly, to automated identification of colonic lesions and luminal blood/hematic traces in colon capsule endoscopy images, enabling the identification of pleomorphic lesions with significant diagnostic and therapeutic clinical relevance.

Colon capsule endoscopy (CCE) has been recently introduced as a minimally invasive alternative to conventional colonoscopy when the latter is contraindicated, unfeasible, or unwanted by the patient. The application of CCE has been extensively studied in the setting of colorectal cancer screening. However, a single CCE examination may produce 50 000 images, the review of which is time-consuming, requiring approximately 50 minutes for completion. Additionally, abnormal findings may be restricted to a small number of frames, thus contributing to the risk of overlooking significant lesions.

By carefully examining the video frames of the CCE, physicians can detect, identify and characterize lesions in the mucosa of the gastrointestinal tract. However, such examination of CCE is significantly time-consuming for gastroenterologists/endoscopists and prone to human error and oversight. In CCE, the record of such images is readily available and can be digitally stored for posterior review and comparison. Within this context, image data creates a robust ground for computer-aided diagnosis using machine learning systems for lesion characterization and, consequently, decision making. The optimized detection of colonic lesions in CCE allows for a minimally invasive alternative to conventional colonoscopy for other common indications, including the investigation of lower gastrointestinal bleeding and colonic lesions other than polyps.

Valério, Maria Teresa, et al. In "Lesions Multiclass Classification in Endoscopic Capsule Frames." Procedia Computer Science 164 (2019): 637-645 raised awareness for the time-consuming and error-prone identification of small bowel lesions by medical experts. Furthermore, the authors proposed an automatic approach for identifying these lesions based on deep learning networks on medically annotated wireless capsule endoscopy images.

Document CN 111127412A provides a pathological image recognition device based on a generation countermeasure network, aiming at solving the problems of dependence on experience, high manual labelling cost, low recognition efficiency, and poor accuracy of the existing pathological recognition method. The method is evaluated for Crohn's disease lesions but does not distinguish which type of lesion each image presents.

Document CN 107730489A discloses a wireless capsule endoscope small intestine lesion meter of efficiently and accurately calculation machine assisted detection system and detection method, using deep learning thought as technological core, utilize the convolution in deep learning model neutral net (Convolutional Neural Network, CNN) algorithm builds different graders, realizes capsule endoscope. The classification and positioning of small intestine lesion and the extraction to focus and to obtain lesion position is realized using image segmentation algorithm. However, it does not use transfer learning and does not update training data with the new data for the next training generation.

Document CN 111340094A, although it discloses a capsule endoscope image auxiliary classification method based on deep learning, does not use transfer learning. It does not update training data with the new data for the next training generation, such as disadvantages such as requirements for extensive datasets of endoscopic images. Also, with such methods, only a minimal number of categories can be used.

Document CN 111739007A discloses a bubble area identifier trained by a convolutional neural network which doesn't consider the classification of colon lesions.

Document WO 2020079696 A1 presents a system to generate and display images of the gastrointestinal tract from capsule endoscopy. The invention does not apply any specific method of artificial intelligence for image classification. The invention provides a platform to deploy methods applied on images. It does not apply convolutional neural networks for image classification.

Document US 2020286219 A1 discloses a method for detection similar images and image classification from video capsule endoscopy. The invention does not apply optimized training sessions for image classification. The method of the invention does not distinguish blood and other colon lesions from capsule endoscope images.

Document US 2018296281 A1 shows a control system for capsule endoscopes based on machine learning image feature recognition. The system controls capsule orientation by calculating the center of mass of the detected image feature. The invention does not apply methods for image classification in capsule endoscope images.

BRIEF SUMMARY OF THE INVENTION

The present invention provides a method for deep learning based identification of pleomorphic colonic lesions in CCE images. Furthermore, the invention enables the identification of luminal blood/hematic traces in the digestive tract, which is crucial in clinical practice, namely in obscure gastrointestinal or iron deficiency anemia in CCE images. The accurate identification of these findings in CCE images is critical for the diagnostic role of CCE, and subsequent therapeutic decisions and the automated identification of clinically relevant lesions in CCE may improve the diagnostic yield of CCE.

By using trained convolutional layers of different architecture combinations using the ImageNet[1] set and further testing them using sample of the CCE image stack, the potential to detect injuries is shown. The disruptive clinical nature of the present invention is justified by the artificial intelligence system's ability to identify clinically relevant colonic lesions with diverse morphology and blood/hematic traces. Indeed, this novel neural network AI based approach is capable of detecting lesions of subtle pleomorphic nature in CCE, improving CCE diagnostic yield. Furthermore, CCE differs from capsule endoscopy by producing double the images and using two recording cameras, making the CCE video analysis challenging and time-consuming for the endoscopist/gastroenterologist. Specifically, CCE automatic detection tools have been scarcely studied. Identifying and differentiating heterogenous colonic mucosal lesions from blood/hematic traces is a relevant novelty introduced by this invention to the current state of the art.

CCE has been demonstrated to be potentially helpful in the setting of colorectal cancer screening for patients with previous incomplete colonoscopy or for whom the last exam is contraindicated, unfeasible, or unwanted. The invention excelled in identifying different protruding colonic lesions (polyps, epithelial tumors, submucosal tumors, nodes), significantly increasing diagnostic performance marks in CCE for colorectal cancer screening.

The hereby described method identifies colonic ulcers and erosions and indirectly measures inflammation in the colonic mucosa. Assessing the colonic mucosal inflammation status is key for diagnosing, staging, and assessing inflammatory bowel disease. Additionally, it is capable of detecting heterogeneous vascular lesions. Colonic vascular lesions are an important etiology of lower gastrointestinal bleeding, and their identification is critical for the therapeutical approach and clinical follow-up of patients affected by these conditions.

Lastly, the method is capable of correctly detecting blood and hematic traces in the digestive tract. The identification of mucosal hemorrhage foci is vital in CCE. The most critical and frequent indications for performing CCE are obscure gastrointestinal bleeding, and the correct assessment of digestive hemorrhage is essential for clinical follow-up management.

The following were considered relevant to highlight the problem solved by the present invention from the methods known in the art to detect and differentiate colonic lesions and blood/hematic residues in colon capsule endoscopy.

Deep learning uses algorithms to model high-level abstractions in data using a deep graph with multiple processing. Using a multilayered architecture, machines employing deep learning techniques process raw data to find groups of highly correlated values or distinctive themes. Hence, preferred is a method where machine learning techniques are used to classify an image.

Advantageously, the method is used in endoscopic images of the colon.

In one embodiment of the present invention, the method detects relevant colonic lesions and blood/hematic traces in colon capsule endoscopy images. It is a useful tool for the evaluation and treatment strategy of patients. Such embodiment of the present invention uses transfer learning and semi-active learning. Transfer learning allows feature extraction and high-accuracy classification using reasonable datasets sizes. Semi-active implementation allows a continuous improvement in the classification system.

Another embodiment of the method splits the dataset into a number of stratified folds, where images relative to a given patient are included in one fold only.

Preferred is a method which uses the chosen training and validation sets to further train a series of network architectures, which include, among others, a feature extraction and a classification component. The series of convolutional neural networks to train include but are not limited to: VGG16, InceptionV3, Xception EfficientNetB5, EfficientNetB7, Resnet50 and Resnet125. Preferably, their weights are frozen, with exception to the BatchNormalization layers, and are coupled with a classification component. The classification component comprises at least two dense layers, preferably of sizes 2048 and 1024, and at least one dropout layer of preferably 0.1 in between them.

Alternatively, but not preferentially, the classification component can be used with more dense layers or with dense layers of different size. Alternatively, but not preferentially, the classification component can also be used without dropout layers.

Further, additionally the best-performing architecture is chosen according to the overall accuracy and sensitivity. Performance metrics include but are not limited to f1-metrics. Further, the method is not limited to two to four dense layers in sequence, starting with 4096 and decreasing in half up to 512. Between the final two layers there is a dropout layer of 0.1 drop rate.

Lastly, the best-performing solution is trained using the complete dataset with patient grouping.

Further embodiments of the present invention may include similar classification networks, training weights and hyperparameters.

These may include the usage of any image classification network, new or not yet designed.

In general, the method includes two modules: prediction and output collector. Prediction collector reads videos and flags images with findings. Conversely, the output collector passes these images with findings for processing.

Examples of advantageous effects of the present invention include: training using parameters from machine learning results of cloud-based every-day increasing datasets; automatically prediction of the colon capsule endoscopy image by using a deep learning method so that the colonic lesions from image input of the colon capsule endoscope can be identified and differentiated between normal mucosa, clinically relevant lesions, and blood/hematic traces; the usage of transfer learning improves the image classification speed and corresponding classification accuracy.

BRIEF DESCRIPTION OF THE DRAWINGS

FIG. 11 illustrates a result of performing deep learning-based lesion classification on the data volume 240 and 250, according to an embodiment of the present invention.

DETAILED DESCRIPTION

Figure 1:
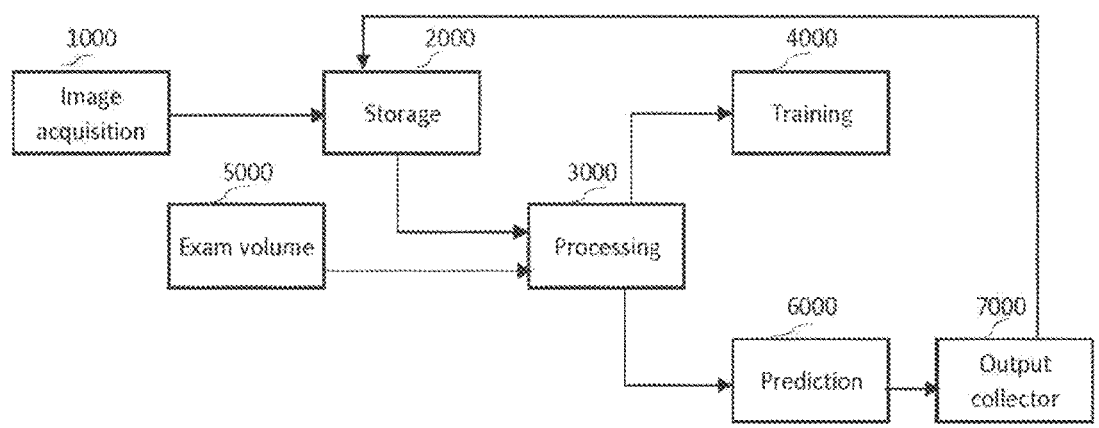
FIG. 1 illustrates a method for detection and differentiation of colon lesions and blood in Colon Capsule Endoscopy according to an embodiment of the present invention.

The present invention discloses a new method and system capable of detecting and differentiating lesions in images acquired during a colon capsule endoscopy exam.

Some preferable embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The term "deep learning" is a machine learning technique that uses multiple data processing layers to classify the data sets with high accuracy. It can be a training network (model or device) that learns based on a plurality of inputs and outputs. A deep learning network can be a deployed network (model or device) generated from the training network and provides an output response to an input.

The term "supervised learning" is a deep learning training method in which the machine is provided already classified data from human sources. In supervised learning, features are learned via labeled input.

The term "convolutional neural networks" or "CNNs" are networks that interconnect data used in deep learning to recognize objects and regions in datasets. CNNs evaluate raw data in a series of stages to assess learned features.

The term "transfer learning" is a machine storing the information learned when attempting to solve one problem to solve another problem of similar nature as the first.

The term "semi-active learning" is used as a process of machine learning. Before executing the next learning process, the training network appends a set of labeled data to the training dataset from a trusted external entity. For example, as a machine collects more samples from specialized staff steps, the less prone it is to mispredict images of identical characteristics.

The term "computer-aided diagnosis" refers to machines that analyze medical images to suggest a possible diagnosis.

The term "Blood" is used to represent the presence of bright blood occupying part or the total section of the colonic lumen. It represents active or recent bleeding. More specifically, the term "Hematic residues" represent fragmented or entire blood clots seen as dark red or brown residues in the lumen of the gastrointestinal tract or adherent to the mucosa. Isolated these residues represent previous bleeding.

The term "colonic lesions" refers to pleomorphic lesions identified by the neural network in colon capsule endoscopy, including protruding lesions, vascular lesions, ulcers/erosions, and other heterogeneous lesions of the mucosa. Protruding lesions encompass lesions bulging towards the lumen of the colon. These lesions may have distinct etiologies and include polyps, epithelial tumors, subepithelial lesions, and nodules. Vascular lesions of the colon include a large variety of individual lesions, precisely red spots, angiectasia, varices, and phlebectasia. Red spots were defined as punctuating (<1 mm) flat lesions with a bright red area, within the mucosal layer, without vessel appearance. Angiectasias were defined as well-demarcated bright red lesions of tortuous and clustered capillary dilatations within the mucosal layer. Varices were defined as raised venous dilatation with a serpiginous appearance. Phlebectasia was identified if a regular bluish venous dilatation running below the mucosa was detected: Ulcers and erosions represent mucosal breaks in the mucosa of the colon. These lesions are distinguished based on estimated size and depth of penetration. "Ulcers" were defined as a depressed loss of epithelial covering, with a whitish base and surrounding swollen mucosa with >5 mm of diameter. Conversely, mucosal erosions were defined as a minimal loss of epithelial layering surrounded by normal mucosa.

The present invention relates to a method for deep learning based colon lesion classification in colon capsule endoscopy images, according to their bleeding potential (FIG. 1). Often, embodiments of the present invention provide a visual understanding of the deep learning colon lesion classification method. Automatic lesion classification of colon images in colon capsule endoscopy is a challenging task since lesions with different bleeding potential have similar shape and contrast. Large variations in the colon preparation before colon capsule ingestion further complicates automated colon lesion classification. Although the automatic training and classification times are fast (on average 10 seconds for a test dataset of 2000 images), the output is not satisfactory for a fast diagnosis by the experts.

A method for colon lesion classification in colon capsule endoscopy according to an embodiment of the present invention. The method comprises an image acquisition module; a storage module; a training input module; a processing module; an exam input module; a training module; a prediction module; an output collector module.

The image acquisition module 1000 receives exam input volumes from colon capsule endoscopy providers. Images and corresponding labels are loaded onto the storage module 2000.

Figure 4:
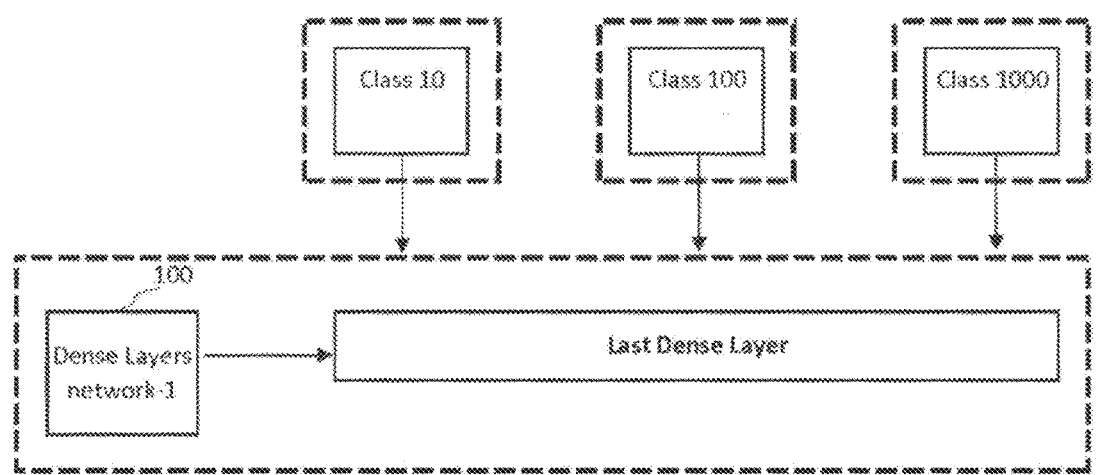
FIG. 4 illustrates the structure of the classification network to distinguish according to bleeding potential.

The storage module 2000 includes a multitude of classification network architectures 100, trained convolutional network architectures 110 and hyperparameters for training. The storage module 2000 can be a local or cloud server. The storage module contains training input labelled data from colon capsule endoscopy images and the required metadata to run processing module 3000, training module 4000, prediction module 5000, a second prediction module 6000, and output collector module 7000. The input labelled data includes, but not only, images and corresponding lesion classification. The metadata includes, but not only, a multitude of classification networks architectures 100 exemplified in FIG. 4, a multitude of trained convolutional neural networks architectures 110, training hyperparameters, training metrics, fully trained models, and selected fully trained models.

Images 1000 and labelled data are processed at the processing module 3000 before running the optimized training at the training module 4000. The processing module normalizes the images according to the deep model architecture to be trained at 3000 or evaluated at 4000. By manual or scheduled request, the processing module normalizes the image data at the storage module 2000 according to the deep model architectures that will run at training module 4000. Additionally, the processing module generates the data pointers to the storage module 2000 to form the partial or full images and ground-truth labels required to run the training module 3000. To prepare each training session, a dataset is divided folds, where patient-specific imagery is exclusive to one and one fold only, for training and testing. The training set is split for model training to generate the data pointers of the all images and ground-truth labels, required to run the training process 9000. K-fold is applied with stratified grouping by patient in the training set to generate the data pointers of the partial images and ground-truth labels, required to run the model verification process 8000 of the training module 4000. The split ratios and number of folds are available at the metadata of the storage module. Operators include but are not limited to users, a convolutional neural network trained to optimize the k-fold or a mere computational routine. Merely as an example, the dataset is divided with patient split into 90% for training and 10% for testing. Optionally, images selected for training can be split into 80% for training and 20% for validation during training. A 5-fold with stratified grouping by patient is applied in the images selected for training. By manual or scheduled request, the processing module normalizes the exam volume data 5000 according to the deep model architecture to run at the prediction module 6000.

Figure 2:
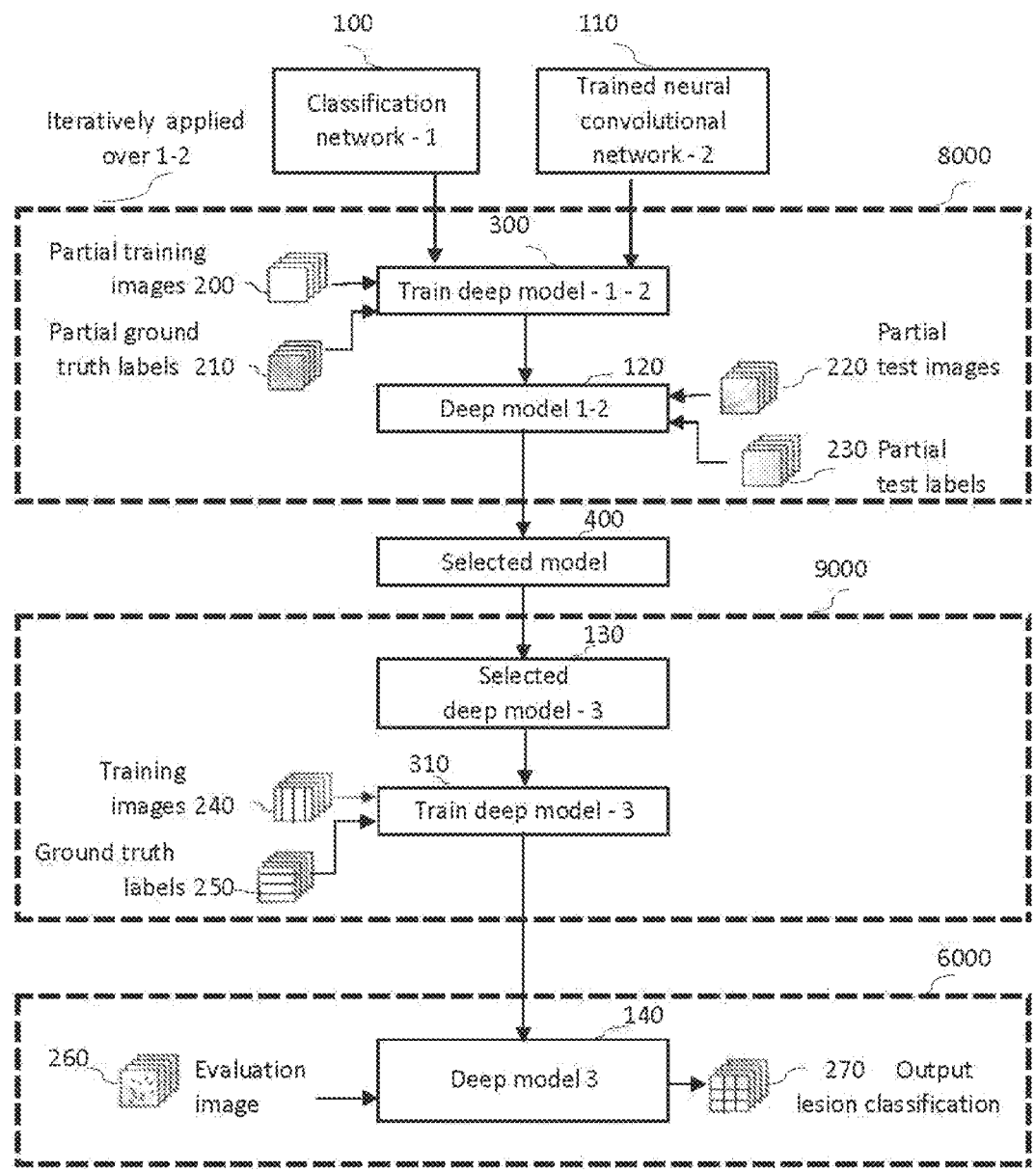
FIG. 2 illustrates the method for automatic detection and differentiation of colon lesions detection and blood in Colon Capsule Endoscopy exam.
Figure 3:
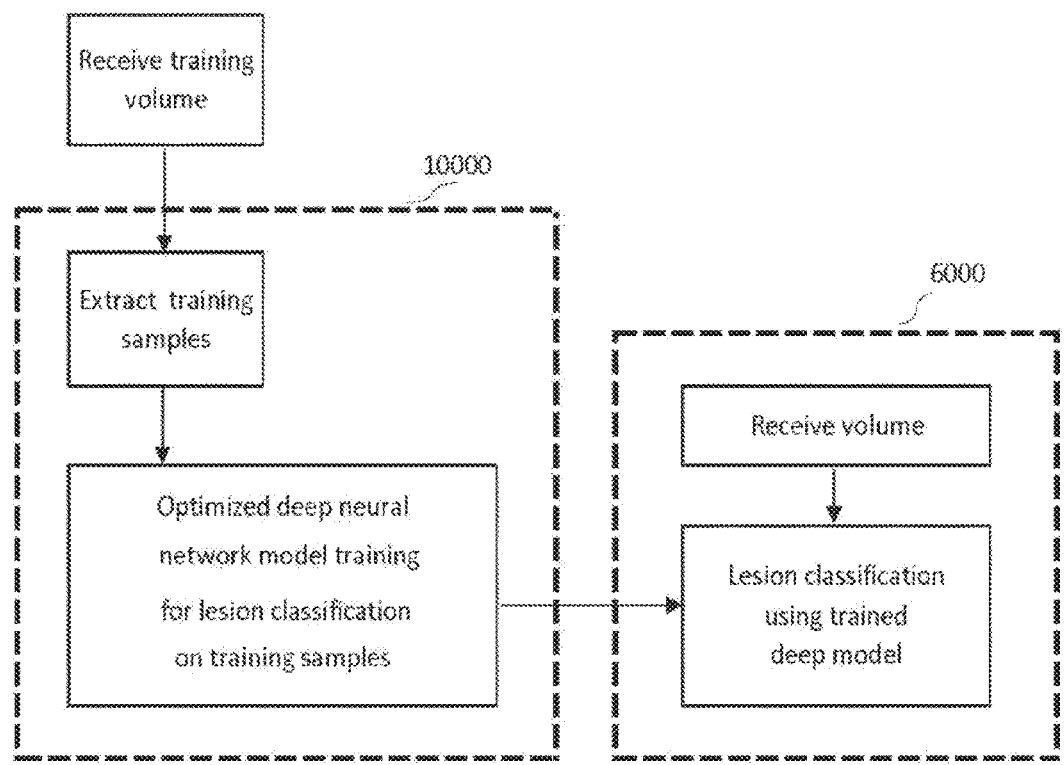
FIG. 3 illustrates the major processes for automatic detection and differentiation of colon lesions detection and blood in Colon Capsule Endoscopy exam.

As seen in FIG. 2, the training module 4000 has a model verification process 8000, a model selection step 400 and a model training step 9000. The model verification part iteratively selects combinations of classification architectures 100 and convolutional networks 110 to train a deep model for colon lesion classification. The classification network 100 has Dense and Dropout layers to classify colon lesions according to their hemorrhagic potential. A neural convolutional network 110 trained on large datasets is coupled to the said classification network 100 to train a deep model 300. Partial training images 200 and ground-truth labels 210 train the said deep model 300. The performance metrics of the trained deep model 120 are calculated using a plurality of partial training images 220 and ground-truth labels 230. The model selection step 400 is based on the calculated performance metrics, such as f-1. The model training part 9000 trains the selected deep model architecture 130, at process 310, using the entire data of training images 240 and ground-truth labels 250. At the prediction module 6000, the trained deep model 140 outputs colon lesion classification 270 from a given evaluation image 260. An exam volume of data 5000 comprising the images from the colon capsule endoscopy video is the input of the prediction module 6000. The prediction module 6000 classifies image volumes of the exam volume 5000 using the best-performed trained deep model from 4000 (see FIG. 3). An output collector module 7000 receives the classified volumes and load them to the storage module after validation by another neural network or any other computational system adapted to perform the validation task.

Merely as exemplificative, the invention comprises a server containing training results for architectures in which training results from large cloud-based large datasets such as, but not only, ImageNet, ILSVRC, and JFT. The architecture variants include, but are not limited to, VGG, ResNet, Inception, Xception or Mobile, EfficientNets. All data and metadata can be stored in a cloud-based solution or in a local computer. Embodiments of the present invention also provide various approaches to make a faster deep model selection. FIG. 2 illustrates a method for deep learning colon lesion classification according to an embodiment of the present invention. The method of FIG. 2 includes a pre-training stage 8000, a training stage 9000. The training stage 8000 is performed with early stopping on small subsets of data to select the best-performed deep neural network for colon lesion classification among multiple combinations of convolution and classification parts. For example, a classification network of two dense layers of size 512 is coupled with the Xception model to train on a random set resulting from k-fold cross validation with patient grouping. Another random set is selected as the test set.

The process of training 8000 with early stopping and testing on random subsets is repeated in an optimization loop for combinations of (i) classification and transfer-learned deep neural networks; (ii) training hyperparameters. The image feature extraction component of the deep neural network is any architecture variant without the top layers accessible from the storage module. The layers of the feature extraction component remain frozen but are accessible at the time of training via the mentioned storage module. The BatchNormalization layers of the feature extraction component are unfrozen so the system efficiently trains with colon capsule endoscope imagens presenting distinct features from the cloud images. The classification component has at least two blocks, each having, among others, a Dense layer followed by a Dropout layer. The final block of the classification component has a BatchNormalization layer followed by a Dense layer with the depth size equal to the number of lesions type one wants to classify.

The fitness of the optimization procedure is computed to (i) guarantee a minimum accuracy and sensitivity at all classes, defined by a threshold (ii) minimize differences between training, validation, and test losses; (iii) maximize learning on the last convolutional layer. For example, if a training shows evidence of overfitting a combination of a shallow model is selected for evaluation.

The training stage 9000 is applied on the best performed deep neural network using the whole dataset.

The fully trained deep model 140 can be deployed onto the prediction module 6000. Each evaluation image 260 is then classified to output a lesion classification 270. The output collect module has means of communication to other systems to perform expert validation and confirmation on newly predict data volumes reaching 270. Such means of communication include a display module for user input, a thoroughly trained neural network for decision making or any computational programmable process to execute such task. Validated classifications are loaded on the storage module to become part of the datasets needed to run the pipelines 8000 and 9000, either by manual or schedule requests.

Figure 5:
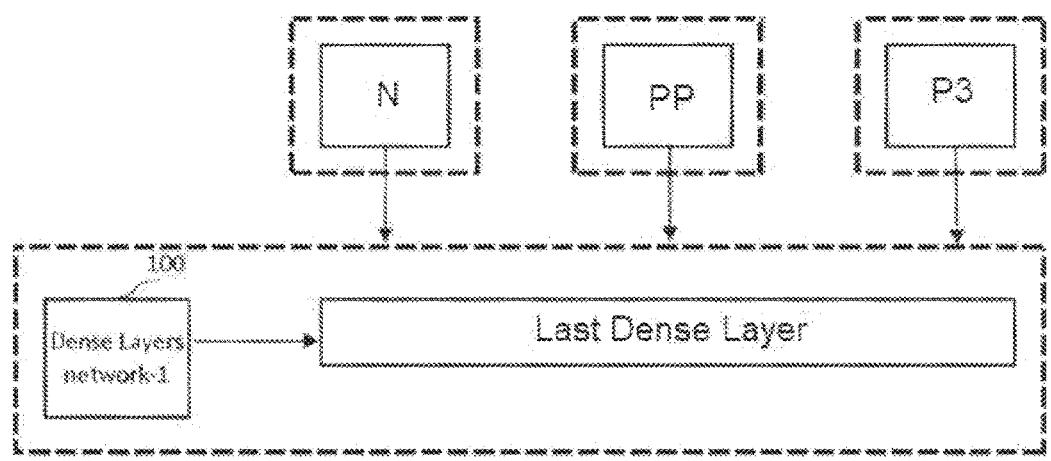
FIG. 5 depicts an embodiment of the classification network to classify according to bleeding potential.
Figure 6:
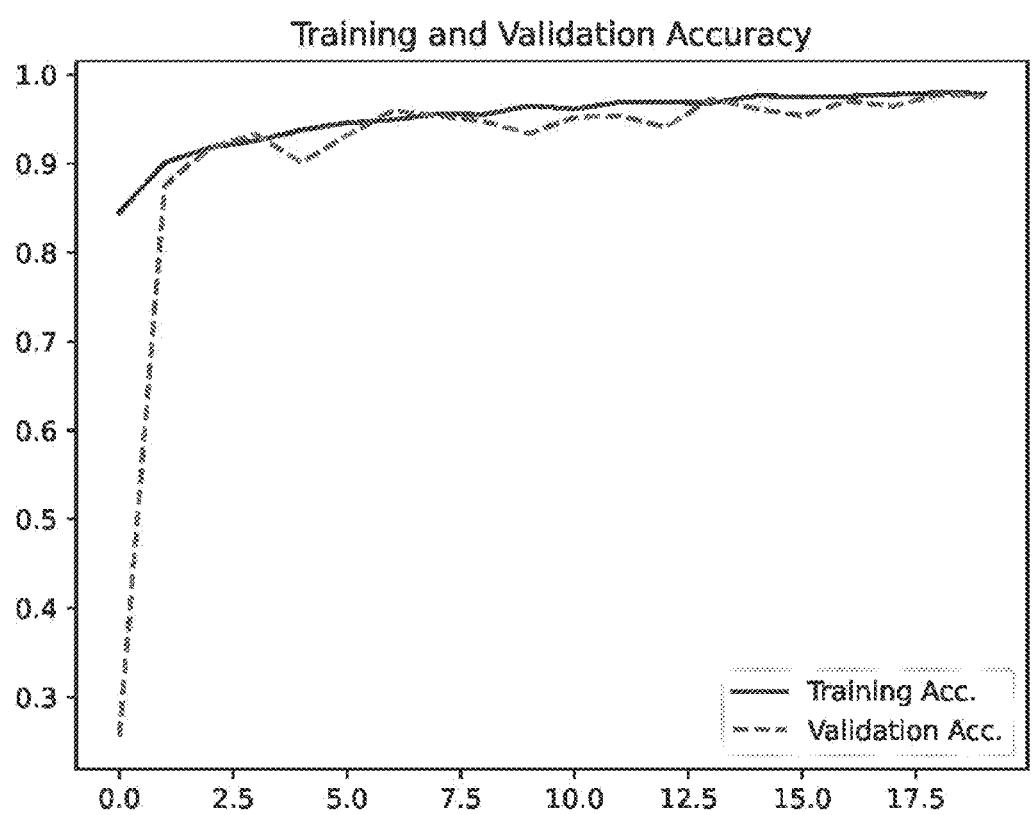
FIG. 6 illustrates a preferable embodiment of the present invention where the accuracy curves for the training on a small subset of images and labelled date are shown. Example of results from an iteration of method 8000.
Figure 7:
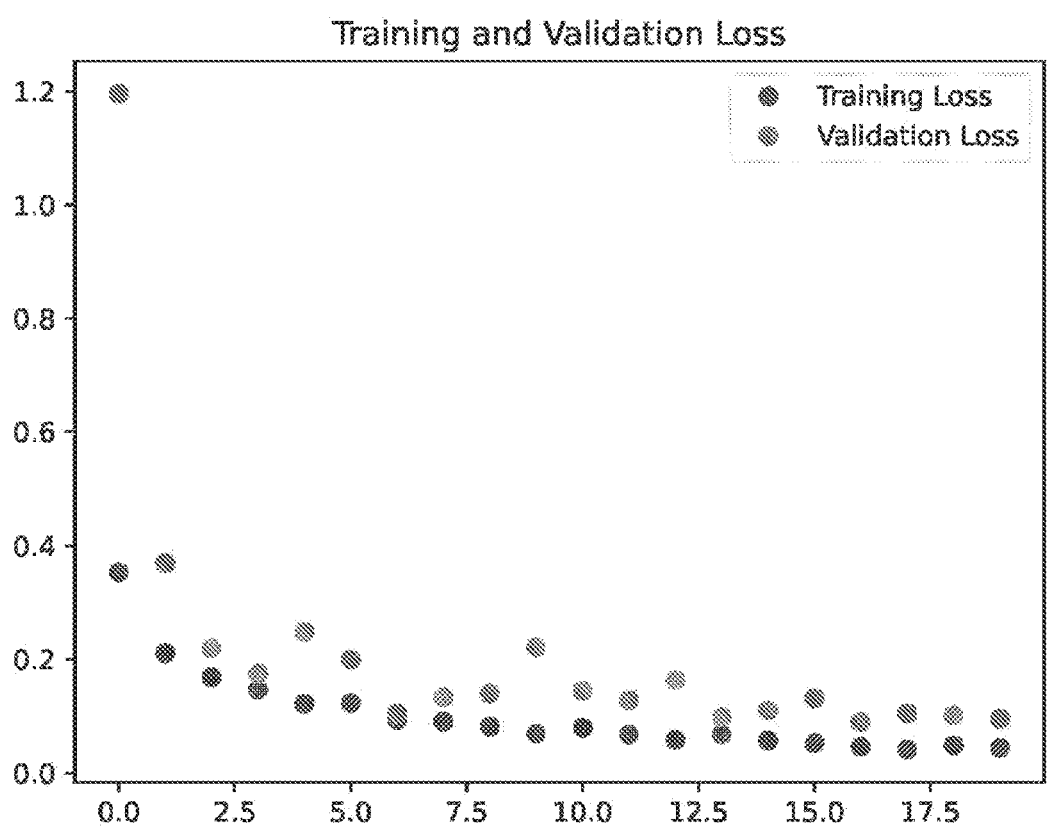
FIG. 7 illustrates exemplary accuracy curves during training on a small subset of images and labelled data and according to an embodiment of the present invention. Example of results from an iteration of method 8000.

An embodiment of the classification network 100, as seen in FIG. 5, can classify according to bleeding potential as N: normal; PP: others; P3: blood; are shown and grouped accordingly. At a given iteration of method 8000 (FIGS. 7, 8, and 9), the optimization pipeline described herein uses accuracy curves, ROC curves and AUC values and confusion matrix from training on a small subset of images and labelled data.

Figure 8:
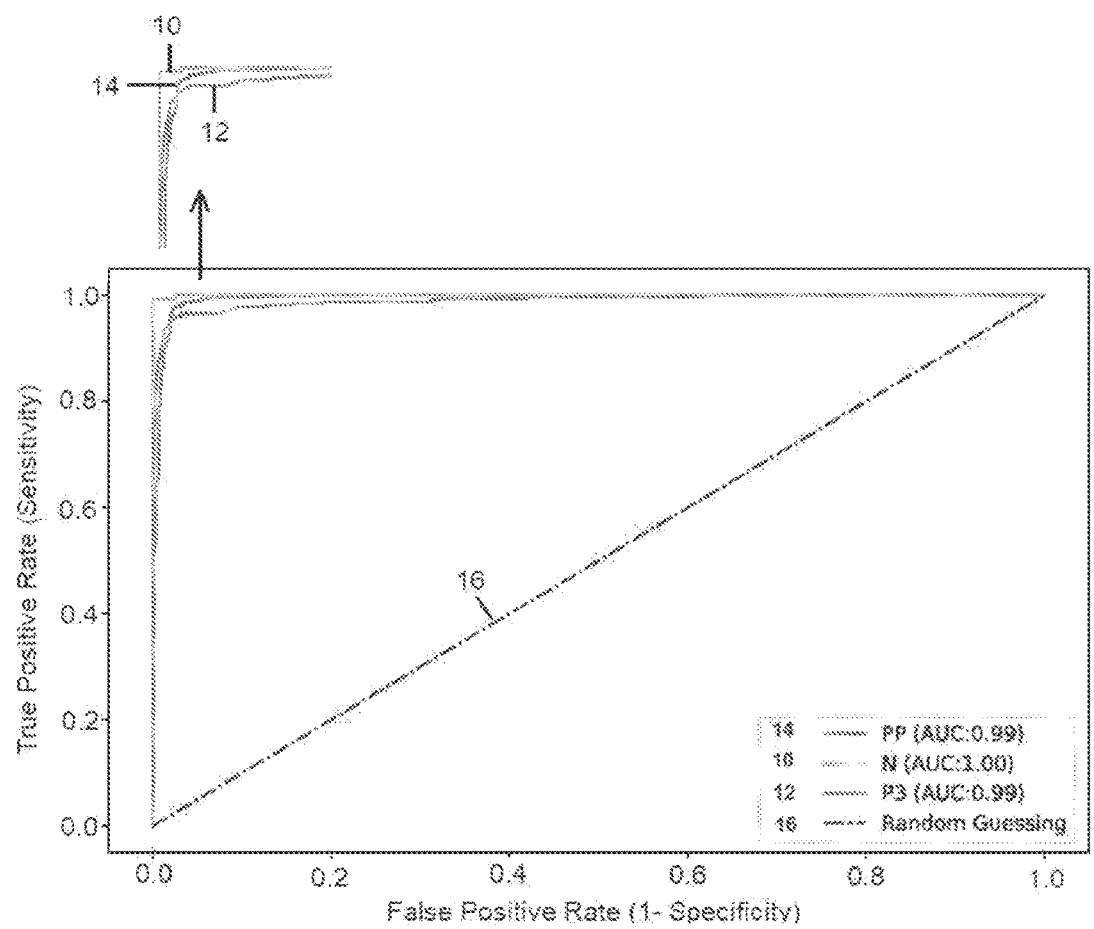
FIG. 8 illustrates exemplary ROC curves and AUC values obtained after training on a small subset of images and labelled data according to an embodiment of the present invention. Results used for model selection. Example of results from an iteration of method 8000, and a zoom of the ROC curves.

FIG. 8 illustrates exemplary ROC curves and AUC values obtained after training on a small subset of images and labelled data where 10 (N—AUC: 1.00); 12 (P3—AUC: 0.99); 14 (PP (AUC: 0.99) and 16 represent the Random Guessing.

Figure 9:
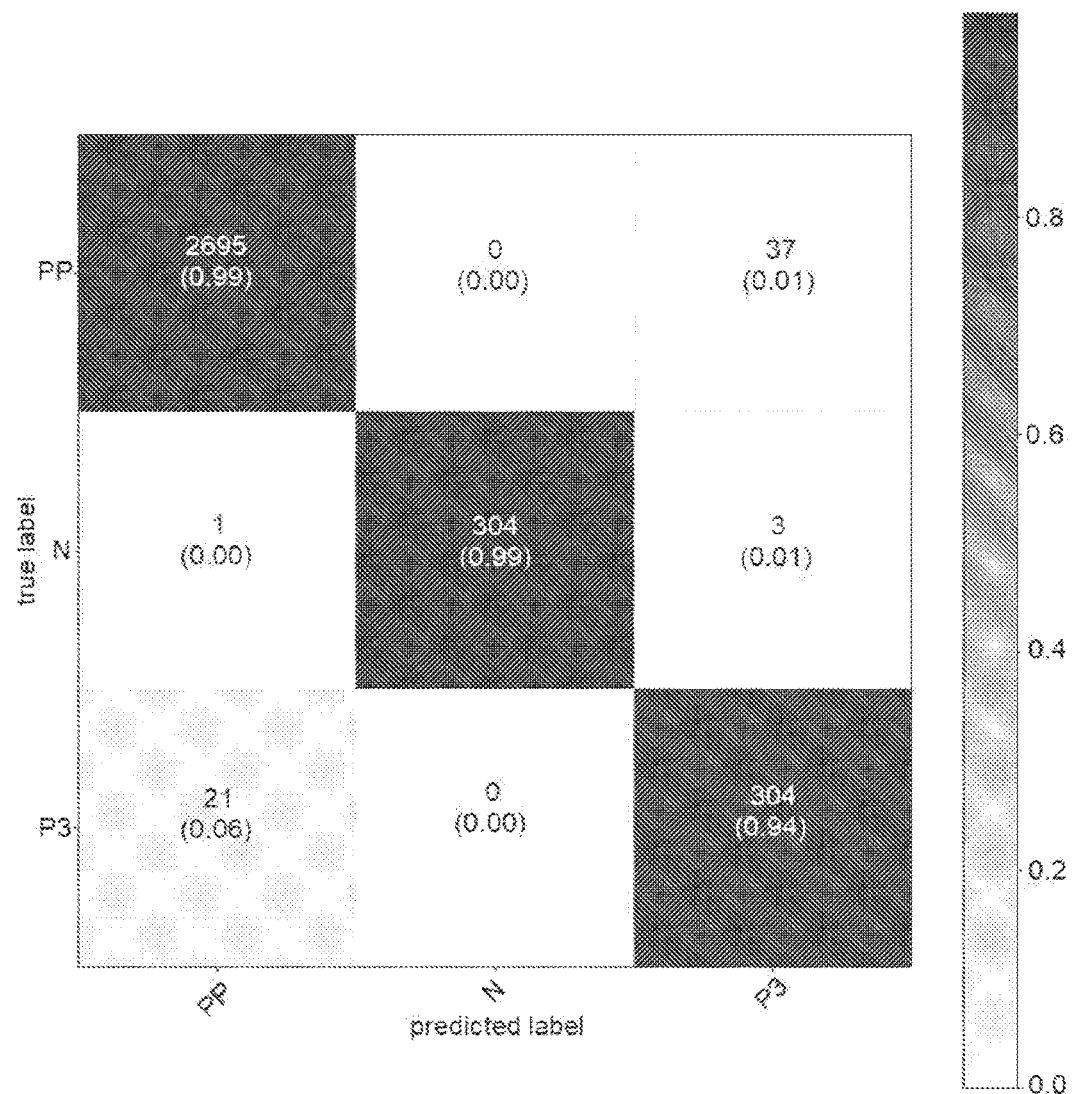
FIG. 9 illustrates an exemplary confusion matrix after training on a small subset of images and labelled data according to an embodiment of the present invention. Results used for model selection. Number of images of the small subset of data and respective class proportion between parentheses.

FIG. 9 illustrates an exemplary confusion matrix after training on a small subset of images and labelled data. Results used for model selection. Number of images of the small subset of data and respective class proportion between parentheses.

Figure 10:
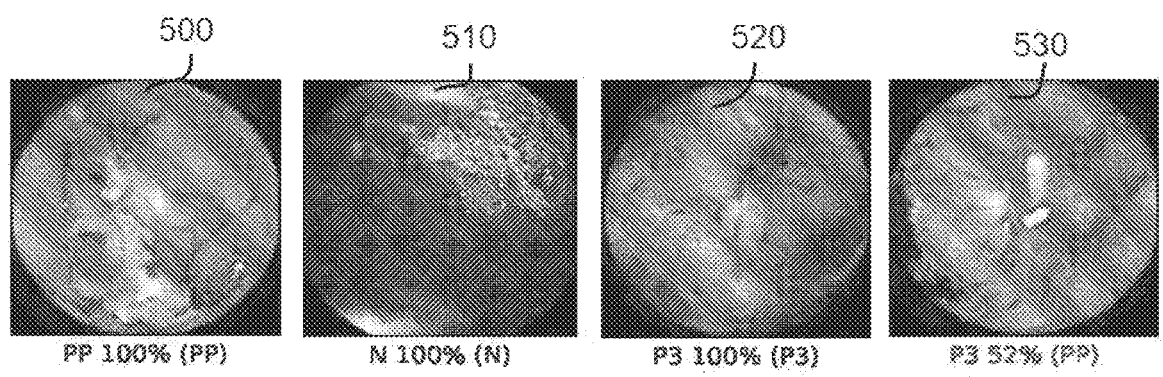
FIG. 10 illustrates examples of lesion classification according to an embodiment of the present invention.

FIG. 10 shows examples of lesion classification according to an embodiment of the present invention, where in 500 there is a lesion; in 510 there is no lesion, in 520 there is Blood, in 530 there is Blood;

FIG. 11 shows a result of performing deep learning-based lesion classification on the data volume 240 and 250, according to an embodiment of the present invention. The results of colon classification using the training method 8000 of the present invention is significantly improved as compared to the results using the existing methods (without method 8000).

Figure 12:
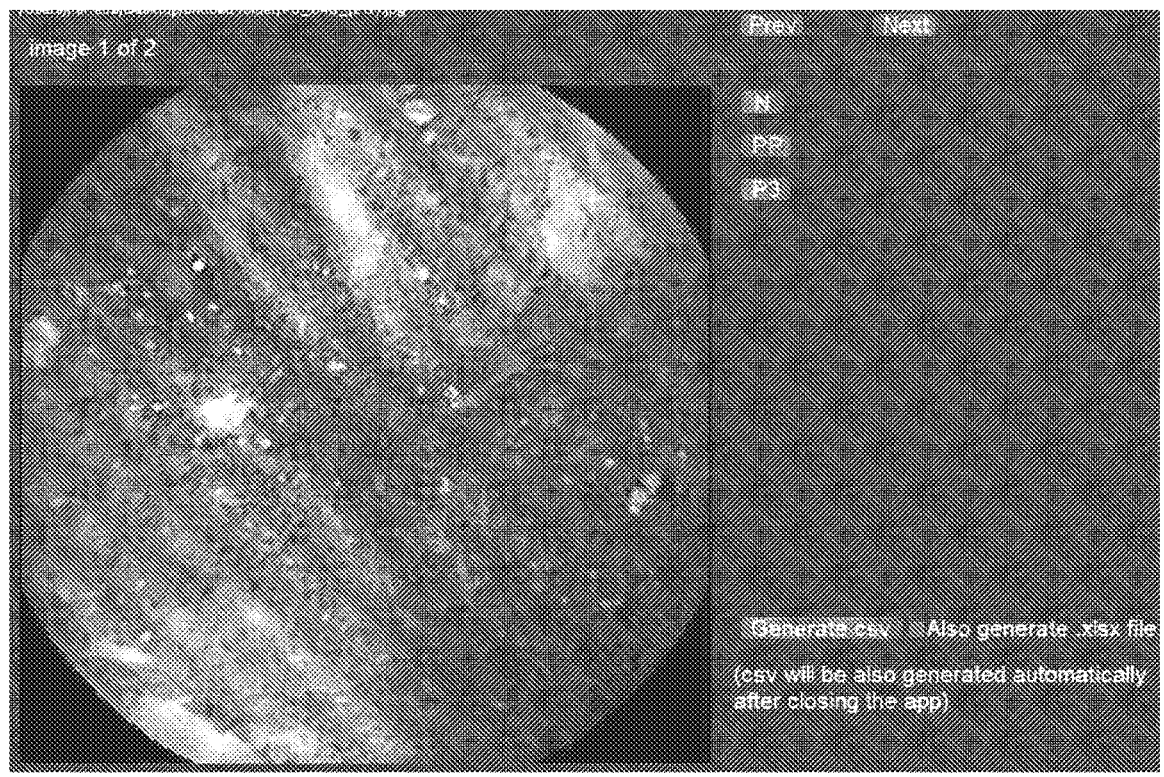
FIG. 12 illustrates an example of a classified lesion waiting for expert confirmation.

FIG. 12 shows an example of a classified lesion, blood/hematic residues, waiting for validation by the output collector module 7000. By another neural network or any other computational system adapted to perform the validation task, physician expert in gastroenterological imagery, identifies colon lesions analyze the labelled image classified by the deep model 140. Options for image reclassification on the last layer of the classification network 100 are depicted in FIG. 5. Optionally, confirmation or reclassification are sent to the storage module.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art within the scope of the appended claims.

The invention claimed is:

1. A computer-implemented method capable of automatically detecting clinically relevant pleomorphic colonic lesions and blood or hematic residues in medical images, comprising:
    detecting colonic lesions and blood or hematic residues in a medical images by classifying pixels as pleomorphic colonic lesions or blood or hematic residues using a convolutional image feature extraction step followed by a classification step and indexing such findings in a set of one of more classes wherein such method comprises:
        the pre-training of a sample of said images in a plurality of combinations of said convolutional image feature extraction step followed by a classification component architecture using pre trained images as training data;
        training of said images with the architecture combination that performs the best;
        prediction of pleomorphic colonic lesions and blood traces using said optimized architecture combination;
        including an output collector with means of communication to third-party validation capable of interpreting the accuracy of the previous steps of the method and correcting a wrong prediction;
        storing the corrected prediction into the storage component.

2. The method of claim 1, wherein the medical images are CCE images.

3. The method of claim 1, wherein the pre-training runs iteratively in an optimization loop.

4. The method of claim 1, wherein the classification network architecture comprises at least two blocks, each having, a Dense layer followed by a Dropout layer.

5. The method of claim 4, wherein the last block of the classification component includes a BatchNormalization layer followed by a Dense layer with the depth size equal to the number of lesions type one wants to classify.

6. The method of claim 1, wherein the set of pre-trained neural networks is the best performing of the following: VGG16, InceptionV3, Xception, EfficientNetB5, EfficientNetB7, Resnet50 or Resnet125.

7. The method of claim 6, wherein the best-performing architecture is chosen based on the overall accuracy and f1-metrics.

8. The method of claim 6, wherein the training of the best-performing architecture comprises two to four dense layers in sequence, starting with 4096 and decreasing in half up to 512.

9. The method of claim 8, wherein between the final two layers of the best performing network there is a dropout layer of 0.1 drop rate.

10. The method of claim 6, wherein between the final two layers of the best performing network there is a dropout layer of 0.1 drop rate.

11. The method of claim 1, wherein the training of images includes the division in one or more patient exclusive folds for optimized training.

12. The method of claim 11, wherein the training of the images includes a ratio of training-to-validation of 10%-90%.

13. The method of claim 12, wherein the lesions are classified as colonic lesions or luminal blood traces.

14. The method of claim 1, wherein the third-party validation is done by user-input.

15. The method of claim 14, wherein the training dataset includes images in the storage component that were predicted by sequentially performing the steps of such method.

16. A portable endoscopic device comprising instructions which, when executed by a processor, cause the computer to carry out the steps of the method of claim 1.

17. The method of claim 1, wherein the last block of the classification component includes a BatchNormalization layer followed by a Dense layer with the depth size equal to the number of lesions type one wants to classify.

18. The method of claim 1, wherein the best-performing architecture is chosen based on the overall accuracy and f1-metrics.

19. The method of claim 1, wherein the training of the best-performing architecture comprises two to four dense layers in sequence, starting with 4096 and decreasing in half up to 512.

20. The method of claim 1, wherein between the final two layers of the best performing network there is a dropout layer of 0.1 drop rate.

21. The method of claim 1, wherein the training of the images includes a ratio of training-to-validation of 10%-90%.

22. The method of claim 1, wherein the lesions are classified as colonic lesions or luminal blood traces.

23. The method of claim 1, wherein the training dataset includes images in the storage component that were predicted by sequentially performing the steps of such method.

* * * * *